Figure 1:
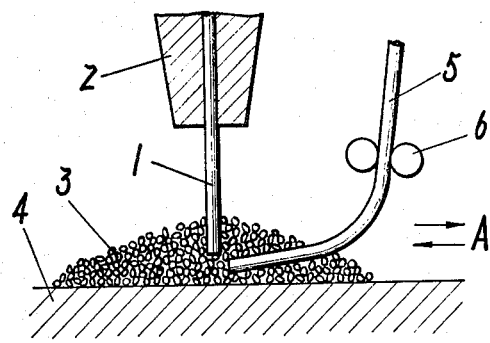

INVENTORS
*Izumi Morimoto &
Hiroshi Nakayama*
BY *Lieber & Nilles*
ATTORNEYS

3,215,809
METAL-ARC WELDING
Izumi Morimoto, B–512 Soshigaya, Apt. 2–160, Soshigaya, Setagaya-ku, and Hiroshi Nakayama, 982 Kanamori, Machida-shi, both of Tokyo, Japan
Filed June 25, 1963, Ser. No. 290,362
8 Claims. (Cl. 219—73)

This invention relates to methods of metal-arc welding and more particularly to a method of automatic submerged arc-welding for steels and cast irons, of the type in which a tubular flux-cored filler wire in addition to an electrode wire are employed in order to form a weld joint in conjunction with a base metal or work while shielding the arc by means of a granular flux in the course of the welding operation.

This invention further relates to an apparatus for use in performing the above-mentioned methods and to a tubular filler steel wire employed thereby.

It has been widely recognized that conventional methods of submerged metal-arc welding possess disadvantages as compared with the hand-welding method in view of the decreased physical properties of welds in spite of the enhanced efficiency of the welding operation in the former which is carried out with an electric current of high density under shielding of the arc by a granular flux.

Among the disadvantages involved in said conventional methods of submerged metal-arc welding there may be cited firstly the increase in oxygen content of the weld which is almost six times as much as that of hand-welding method, resulting in the impaired impact property, i.e. notch-ductility of weld which may be attributed to the inadequate deoxidation action of a prefused granular flux for use in shielding the arc which contains as major ingredients $MnO$, $SiO_2$, $CaO$, $Al_2O_3$ and $MgO$ and which is not capable of effecting sufficient deoxidation action in the course of a welding operation; secondly, the increase in silicon content in company with the tremendous increase in non-metallic inclusions such as silicates in the weld which deteriorates the ductility of weld; and thirdly, the high density of electric current employed for the welding operation which incurs a large input of heat per unit bead, slacking the cooling rate of the weld, and resulting in the formation of such a metallographical structure comprising coarse and brittle crystals as dendritic structure due to which the ductility of weld is reduced to a considerable extent.

To solve these problems the present invention contemplates the provision of novel automatic arc-welding methods having features and advantages which will be illustrated in the following:

(1) high impact property, i.e., the resistance to brittle fracture of weld is obtained by virtue of high deoxidation effect and lesser existence of acidic non-metallic inclusions.

(2) Improvement in impact property of weld is attained because of a faster cooling rate of molten weld which results in avoidance of formation of dendritic structure comprising coarse crystals.

(3) Improvement in efficiency of hard-surfacing welding is attained because of the increase in quantity of deposited welds and in the width of beads.

(4) The welding method of the present invention is applicable more extensively to various types of steel on the ground that alloying element such as Cr, Mo, Ni, V, and the like may be contained as desired in the core flux of the tubular filler steel wire.

(5) The zone on which metal is affected by welding heat is diminished so that a weld of lesser brittleness and softening is obtained.

(6) The welding method is lesser sensible to cracks of weld.

(7) Welding stress is reduced.

(8) The number of layer of welds may be eliminated because of a large quantity per layer of welds so that duration of welding operation is reduced.

(9) As compared with the case in which a bonded flux is used as shielding flux, a higher density of electric current may be employed, resulting in a higher rate of welding so that the same welding conditions with high efficiency as in conventional methods of submerged arc-welding may be applied to the present method.

The tubular filler steel wire in accordance with the present invention comprises an outer sheath made of thin strip steel so fabricated as to have a substantially circular section and an inner core composed of any kind as desired of deoxidising agent, slag-producing material, denitrifying agent, arc-stabilising agent and alloying element, these being in the comminuted form. Hence, in accordance with the invention a weld fit for work or a base metal such as for example high tensile steel, stainless steel, cast iron, chromium-molybdenum-steel and the like may be obtained. Further, a weld low in phosphorus and sulphur contents is obtained on the ground that the basicity of the weld slag may be increased by adding calcium compound to the core which facilitates deoxidation, desulphurisation, and dephosphorisation of the weld pool. It will be understood that the size of the filler wire is changeable in accordance with that of the electrode wire and a specific purpose of the welding.

Accordingly, it is an object of the present invention to provide an improved weld having a considerably reduced content of oxygen and non-metallic inclusions by virtue of the complete deoxidation effected by an adequate amount of deoxydising agent contained in the core of a filler wire and having thereby a higher impact value.

It is another object of the present invention to provide an improved weld having a nitrogen content tremendously reduced by virtue of a denitrifying agent contained in the core of a filler wire, silicon, sulphur, and phosphorus contents considerably reduced owing to the increased basicity of the weld slag, particularly to a calcium compound produced in the slag which facilitates the removal of the sulphur and phosphorus from the weld metal and having thereby a higher impact value.

Still another object of the present invention to provide an improved weld comprising crystal grains of considerably fine size by way of feeding a cool filler wire to a molten metal pool while obviating the growth of dentrictic structure in the weld, resulting in facilitating to cool the molten metal pool so that physical properties, particularly notch ductility of the weld in improved and in addition the zone on which welding heat affects is reduced in the width and in the brittleness, subjecting to a lesser weld stress.

It is a further object of the present invention to provide a metal arc-welding method in which a filler wire is permitted to melt by the arc heat produced by the electrode wire so that the amount of weld per unit time of welding operation and per unit electric power consumed is remarkably increased accompanying the increased welding efficiency.

Still another object of the present invention is to provide a weld having a composition fit for the base metal, said composition being adjustable by way of adding any kind of alloying element as desired to the inner core of a filler wire so as to obtain a weld having a composition which is metallurgically compatible with the base metal, while keeping the ingredients of the electrode and the outer sheath of the filler wire unvaried, so that the welding operation is carried out with easiness and economy.

Other objects and their means of attainment will be apparent from the following disclosure.

The automatic arc-welding method in accordance with the present invention comprises employing an electrode wire of any type from which welding arc is produced under shielding by a granular flux, employing a filler steel wire having tubular contour, the outer sheath of said filler wire containing or not containing deoxidising agent and the inner core of said filler wire comprising a core flux and/or a metallic material disposed within said flux, permitting said filler wire to either mechanically co-operate with said electrode wire or to be fed at an optional rate by means of a motor independent from a motor for use in feeding the electrode wire, and allowing the filler wire to melt by virtue of arc heat generated by the electrode wire. The core of the filler wire may be composed of deoxidising agent such as ferromanganese and ferrosilicon, or denitrifying agent such as ferrozircon, or slag-producing material for facilitating the welding operation and for adjusting the basicity of slag in the weld pool, and/or various alloying elements such as nickel, chromium, molybdenum, titanium and zirconium.

Figure 2:
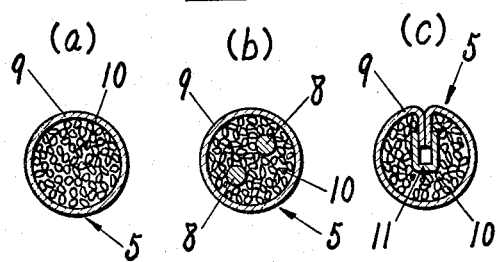
Figure 3:
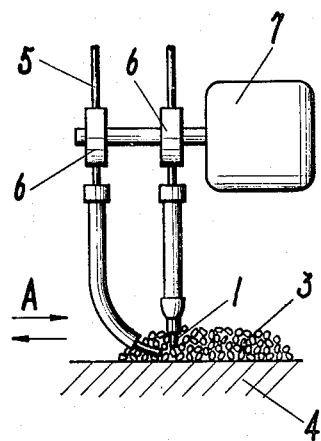
Figure 4:
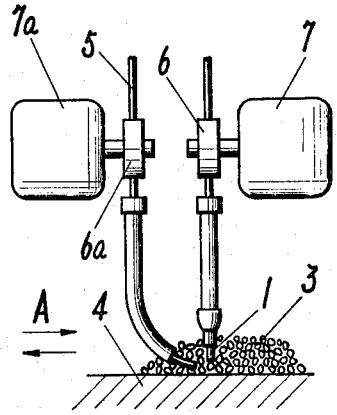

The present invention will be further disclosed by reference to the attached drawings in which:

FIGURE 1 represents a generally schematic side view of the apparatus in accordance with the invention;

FIGURES 2(a), (b), and (c) represent an enlarged cross-sectional view of preferred flux cored filler wires of the invention;

FIGURE 3 represents a schematic side view of an apparatus for use in embodiment of the present invention; and FIGURE 4 represents a schematic side view of another apparatus for use in embodiment of the present invention.

The apparatus shown in FIGS. 1, 3, and 4 comprises a motor 7 for use in feeding an electrode wire 1 having an electrode tip 2 and a motor 7; 7a for use in feeding a tubular flux-cored filler steel wire 5 guided by means of rollers 6; 6a which melts by virtue of an arc produced between the electrode wire and a base metal or work 4, said arc being shielded by a granular flux 3 serving at the same time as a protective blanket over the pool of molten metal (not indicated). Arrow A indicates the direction in which a welding operation proceeds. In the apparatus shown in FIG. 3 the electrode wire and the filler wire mounted on one and the same shaft are adapted to effect a mechanically synchronised motion by means of a motor 7 whereas the filler wire in the apparatus shown in FIG. 4 is fed at an optional rate by means of motor 7a, which operates independently from motor 7 so that non-synchronised relationship is established between the electrode wire and the filler wire in the latter case.

The tubular flux-cored filler wires shown in FIGS. 2(a) through (c) comprises an outer sheath 9 of thin strip steel in the form of a tube and an inner core composed of a comminuted flux 10 only and/or a comminuted flux together with a metallic material preferably in the form of bar 8 disposed within the said flux. As shown in FIG. 2(c), said sheath may have a seam curved inwardly which is sealed by a metallic material 11 in order to prevent the comminuted core flux from falling-off. In any case, no current is turned on the filler wire.

The following examples illustrate specific embodiments of this invention.

Example 1

Welding of mild steel was performed by use of a filler wire of the invention containing in its interior 5% to 50% by weight ferromanganese and 20% to 90% by weight fluorspar in addition to 5% to 20% by weight titania and 20% to 90% by weight wollastonite, the results of which are shown in the following table.

| Method | Chemical composition of Weld in percent | Dendritic structure | Impact value in kgm./cm.$^2$ at 0° C. | Ratio of deposition rate |
|---|---|---|---|---|
| This invention | C: 0.05, Si: 0.12, Mn: 0.63, P: 0.015, S: 0.014, Cu: 0.20. | Crystal grains finer; Growth of dendritic crystals inappreciable. | 20.2 | 1.3 to 2.0 |
| Prior art | C: 0.07, Si: 0.51, Mn: 1.21, P: 0.020, S: 0.022, Cu: 0.18. | Crystal grains larger; Growth of dendritic crystals remarkable. | 6.0 | 1.0 |

Specifically, the core flux of the filler wire employed in Example 1 consisted of fluorspar 40%, ferromanganese 10%, titania 10% and wollastonite 40%, all the percentages being weight.

Example 2

Welding of steels having high tensile strength in the order of 60 kg./mm.$^2$ was performed by use of a filler wire of the invention containing in its interior 5% to 50% by weight nickel, 5% to 20% by weight molybdenum, 5% to 40% by weight ferromanganese and 10% to 70% by weight fluorspar in addition to up to 30% by weight titania and 10% to 70% by weight wollastonite.

| Method | Chemical composition of Weld in percent | Dendritic structure | Impact value in kgm./cm.$^2$ at 0° C. | Ratio of deposition rate |
|---|---|---|---|---|
| This invention | C: 0.04, Si: 0.26, Mn: 0.98, P: 0.016, S: 0.012, Ni: 1.12, Mo: 0.36. | Crystal grains finer; Growth of dendritic crystals inappreciable. | 11.0 | 1.3 to 2.0 |
| Prior art | C: 0.06, Si: 0.25, Mn: 1.01, P: 0.024, Si: 0.025, Ni: 0.034, Mo: 0.040. | Crystal grains coarser; Growth of dendritic crystals remarkable. | 5.8 | 1.0 |

Specifically, the core flux of the filler employed in Example 2 consisted of fluorspar 50%, ferromanganese 14%, titania 8%, wollastonite 12%, nickel 10% and molybdenum 6%, all percentages being by weight.

Example 3

Welding of steels having high tensile strength in the order of 70 kg./mm.$^2$ was performed by use of a filler wire containing in its interior 5% to 70% by weight nickel, 5% to 60% by weight chromium, 5% to 30% by weight molybdenum, 5% to 40% by weight ferromanganese and 10% to 70% by weight fluorspar in addition to up to 30% by weight titania and 10% to 70% by weight wollastonite.

| Method | Chemical composition of Weld in percent | Dendritic structure | Impact value in kgm./cm.² at 0° C. | Ratio of deposition rate |
|---|---|---|---|---|
| This invention | C: 0.06, Si: 0.24, Mn: 1.22, P: 0.018, S: 0.012, Cr: 0.23, Ni: 1.68, Mo: 0.45. | Crystal grains finer | 11.8 | 1.3 to 2.0 |
| Prior art | C: 0.06, Si: 0.32, Mn: 1.28, P: 0.018, S: 0.020, Cr: 0.18, Ni: 1.62, Mo: 0.44. | Crystal grains coarser | 6.4 | 1.0 |

Specifically, the core flux of the filler wire employed in Example 3 consisted of fluorspar 39%, ferromanganese 10%, titania 10%, wollastonite 15%, nickel 12%, molybdenum 8%, and chromium 6%, all percentages being by weight.

Example 4

Welding of steels having high tensile strength in the order of 80 kg./mm.² was performed by use of a filler wire of the invention containing in its interior nickel, chromium, molybdenum, ferromanganese and fluorspar within the ranges specified in Example 3.

Specifically, the core flux of the filler wire employed to produce the weld analyzed in the first line of the above chart consisted of 28% fluorspar, 20% ferromanganese, 18% titania, 28% wollastonite, and 6% chromium, all percentages by weight. The core flux of the filler wire employed to produce the weld analyzed in the second line of the above chart consisted of 27% fluorspar, 11% ferromanganese, 20% titania, 27% wollastonite, 8% molybdenum, and 7% chromium. The core flux used to make the weld analyzed in the third line of the chart consisted of 28% fluorspar, 18% ferromanganese, 29%

| Method | Chemical composition of Weld in percent | Dendritic structure | Impact value in kgm./cm.² at 0° C. | Ratio of deposition rate |
|---|---|---|---|---|
| This invention | C: 0.06, Si: 0.23, Mn: 1.45, P: 0.018, S: 0.014, Cr: 0.52, Ni: 1.80, Mo: 0.54. | Crystal grains finer | 12.4 | 1.3 to 2.0 |
| Prior art | C: 0.06, Si: 0.43, Mn: 1.90, P: 0.017, S: 0.015, Cr: 0.57, Ni: 2.60, Mo: 0.55. | Crystal grains coarser | 5.8 | 1.0 |

Specifically, the core flux of the filler wire employed in Example 4 consisted of fluorspar 30%, ferromanganese 14%, titania 10%, wollastonite 12%, nickel 16%, molybdenum 10%, and chromium 8%, all percentages being by weight.

Example 5

Hard-surfacing welding was performed in accordance with the invention by use of a filler wire of the invention containing in its interior one or more of the following elements or compounds in the following amounts, 20% to 100% by weight nickel, 5% to 80% by weight chromium, 5% to 80% by weight molybdenum, 5% to 50% by weight chrome carbide, 5% to 80% by weight ferromanganese, and up to 30% by weight fluorspar in addition to up to 20% by weight titania, up to 30% by weight wollastonite, and 50% to 100% by weight tungsten carbide.

| Chemical composition of weld (in percent) | | |
|---|---|---|
| C | Si | Mn |
| 0.06 to 0.10 | 0.80 to 1.20 | 0.85 to 1.20 |
| 0.06 to 0.10 | 0.80 to 1.30 | 0.90 to 1.30 |
| 0.03 to 0.40 | 0.30 to 0.60 | 2.80 to 3.20 |
| 0.60 to 0.75 | 0.80 to 1.00 | 0.60 to 1.00 |
| 2.50 to 3.00 | 0.60 to 1.00 | 0.80 to 1.20 |

| Chemical composition of weld (in percent) | | Hardness of weld (in Hv) |
|---|---|---|
| Cr | Mo | |
| 0.40 to 0.60 | | 225 to 275 |
| 0.60 to 0.90 | 0.10 to 0.30 | 325 to 375 |
| 5.00 to 6.00 | 0.30 to 0.50 | 480 to 560 |
| 2.00 to 3.00 | 0.10 to 0.30 | 650 to 740 |
| W plus Co 50.0 to 55.0 | | Below 740 | wollastonite, 10% molybdenum, and 15% chrome carbide. The core flux used to make the weld analyzed in the fourth line of the above chart consisted of 27% fluorspar, 18% ferromanganese, 16% titania, 4% wollastonite, 21% nickel, 6% molybdenum, and 8% chromium. The core flux used to make the weld analyzed in the last line of the chart consisted of 10% fluorspar, 10% ferromanganese and 80% tungsten carbide.

Also, it is possible in accordance with the present invention to employ an electrode wire made of mild steel while feeding a tubular filler wire having its interior filled with a flux, which contains specific alloying elements such as chromium, nickel, molybdenum and tungsten carbide, or to employ an electrode wire containing specific ingredients while feeding a filler wire having its interior filled with a flux, which contains specific alloying elements in order that a weld fit for the base metal of any kinds including alloy steels such as stainless steel, tungsten-steel, chromium-molybdenum-steel, and cast irons is obtained. The filler wire may be of the same kind as the base metal.

In accordance with the welding method of our invention, deoxidation action is preferably effected for that when supplied the deoxidising agent is in non-oxidised state.

In contradistinction to the prior art in which there has been used a specific electrode wire containing in its interior a considerable amount of deoxidising agent for the purpose of compensating the inadequate deoxidation action, an electrode wire of ordinary steels may be employed with full satisfaction in the method according to the present invention in which a flux-cored filler steel wire is employed.

Further, in addition to deoxidising agent a suitable amount of alloying element such as nickel, chromium, molybdenum, and vanadium may be added to the interior of a filler wire in accordance with the present invention so as to adjust the chemical composition of weld to be obtained. Hence, as shown by the examples in the foregoing, welding of various steels having high tensile strength in the order of as for example 60 kg./mm.², 70 kg./mm.², 80 kg./mm.², and 100 kg./mm.² and of other types of steel to be used at lower temperatures may be easily performed. In addition, hard surfacing welds having hardness (HV) as required may be obtained. These purposes have not been fulfilled in the prior art.

Still further, in accordance with the invention the inner core of filler wire may comprise various types of flux so that the concentration of silicate in the slag pool of the weld is reduced. As a result, the amount of reduced silicon and non-metallic inclusions entering into weld is diminished and the ductility of weld therefore is considerably improved.

Furthermore, since no current is turned on the filler wire in accordance with the invention, the same is caused to melt only by virtue of arc heat generated due to the contact of the electrode wire with the base metal, contributing to reduction in the density of electric current. Accordingly, the growth of dendritic structure incurring deterioration of ductility of weld is checked, the welding stress is diminished, the zone on which arc heat affects is rendered lesser brittle or soft, the crack-resisting property is remarkably improved, and concurrently efficiency of welding is improved to a great extent by virtue of the deposition of metallic ingredients of the filler wire in accordance with the present invention.

In accordance with the same principle on which the present invention is based, vertical welding method may be performed for two upright steel plates oppositely arranged while employing cooling copper shoes which are adapted to move continuously along an aperture created between said steel plates from the bottom to the top of said aperture to obtain a satisfactory weld either with or without employment of a granular flux for use in shielding the arc.

What we claim is:

1. A submerged arc welding method in which the arc produced from an electrode of steel wire is shielded by a granular flux characterized by the feeding of a tubular filler wire to said arc, said tubular wire comprising an outer tubular sheath of steel containing as a deoxidizing agent up to 5% manganese, up to 5% silicon and up to 3% aluminum and a core flux composed of at least one of the following, deoxidizing agent, denitrifying agent, alloying element, slag producing material, and arc stabilizing agent; and allowing said tubular filler steel wire to melt by the heat of the arc produced by said electrode wire.

2. The method of claim 1 wherein the core flux contains at least one deoxidizing agent selected from a group comprised of calcium, magnesium and zirconium in addition to at least one of the following; manganese, silicon and titanium.

3. The welding process of claim 1 characterized by the continuous feeding of the tubular filler steel wire independent of said electrode wire.

4. The welding process of claim 1 characterized by the continuous feeding of the tubular filler steel wire in synchronized relationship with said electrode wire.

5. Tubular filler steel wire for use in welding mild steel in accordance with the method of claim 1 having ingredients:

| | Percent by weight |
|---|---|
| Fluorspar | 20 to 90 |
| Ferromanganese | 5 to 50 |
| Titania | 5 to 20 |
| Wollastonite | 20 to 95 |

6. Tubular filler steel wire for use in welding steels of high tensile strength in accordance with the method of claim 1 having ingredients:

| | Percent by weight |
|---|---|
| Fluorspar | 10 to 70 |
| Ferromanganese | 5 to 40 |
| Titania | up to 30 |
| Wollastonite | 10 to 70 |
| Nickel | 5 to 60 |
| Molybdenum | 5 to 20 |

7. Tubular filler steel wire for use in welding steels of ultra high tensile strength in accordance with the method of claim 1 having ingredients:

| | Percent by weight |
|---|---|
| Fluorspar | 10 to 70 |
| Ferromanganese | 5 to 40 |
| Titania | up to 30 |
| Wollastonite | 10 to 70 |
| Nickel | 5 to 70 |
| Molybdenum | 5 to 30 |
| Chromium | 5 to 60 |

8. Tubular filler steel wire for use in hard surfacing welding in accordance with the method of claim 1 having ingredients:

| | Percent by weight |
|---|---|
| Fluorspar | up to 30 |
| Ferromanganese | 5 to 80 |
| Titania | up to 20 |
| Wollastonite | up to 30 |
| Nickel | 20 to 100 |
| Molydenum | 5 to 80 |
| Chromium | 5 to 80 |
| Chrome carbide | 5 to 50 |
| Tungsten carbide | 50 to 100 |

References Cited by the Examiner

UNITED STATES PATENTS

| 1,501,266 | 7/24 | Brace | 219—146 |
| 2,395,723 | 2/46 | Chmielewski | 219—137 |
| 2,681,970 | 6/54 | Koopman | 219—137 |
| 2,909,650 | 10/59 | Landis | 219—146 |
| 2,931,886 | 4/60 | Nunnelee et al. | 219—76 |
| 3,024,352 | 3/62 | Daubier | 219—126 |
| 3,033,977 | 5/62 | Quaas | 219—146 |

RICHARD M. WOOD, *Primary Examiner.*